United States Patent

[11] 3,589,776

| [72] | Inventor | Heinz Wehde |
| | | Heidelberg, Germany |
| [21] | Appl. No. | 829,864 |
| [22] | Filed | June 3, 1969 |
| [45] | Patented | June 29, 1971 |
| [73] | Assignee | Teldix G.m.b.H. |
| | | Heidelberg, Germany |

[54] SIGNAL GENERATOR
3 Claims, 4 Drawing Figs.

[52] U.S. Cl. .................................................. 303/21,
188/181 A
[51] Int. Cl. ................................................... B60t 8/16
[50] Field of Search ................................ 303/21, 6,
24, 68—69, 61—63; 188/181

[56] References Cited
UNITED STATES PATENTS
3,017,145  1/1962  Yarber ................. 303/21 UX
3,030,464  4/1962  Zeigler ................. 303/21 X
3,450,444  6/1969  Ballard .................. 303/21

Primary Examiner—Milton Buchler
Assistant Examiner—John J. McLaughlin
Attorney—Spencer & Kaye ABSTRACT: A vehicle brake system is provided with mechanism to prevent locking of the vehicle wheels during brake application so that not only will the directional stability of the vehicle be retained but also the braking effort will be more efficient. The wheel-associated signal generators are of the small size and may be directly attached to the vehicle wheels and incorporate freely rotatable inertial masses employing inductive or capacitive elements which allow acceleration and deceleration forces to be detected without the utilization of electrical contacts. The freely rotatable inertial mass is damped in accord and as a function of the rotational speed of the wheel. The spacing between the pulses emitted by the signal generator is detected by a control arrangement which produces a control signal to actuate the pressure control means of the break system if the spacing between adjacent pulses is shorter than a predetermined minimum value.

INVENTOR.
HEINZ WEHDE
BY Spencer & Kaye
Attorneys

SIGNAL GENERATOR

BACKGROUND OF THE INVENTION

Prior copending applications assigned to the same assignee as the present application discloses various vehicle braking systems in which the usual operator-controlled master cylinder and the wheel cylinders which discretely controls the pressure within the wheel cylinders to provide an antilocking brake system. Examples of such systems are shown in copending applications Ser. No. 683,236, filed Nov. 15, 1967, and Ser. No. 771,079, filed Oct. 28, 1968, and in U.S. Pat. No. 3,523,712 issued Aug. 11, 1970, and Ser. No. 771,079, filed Oct. 28, 1968, and in U.S. Pat. Nos. 3,401,986 and 3,401,987.

In application Ser. No. 683,236, the signal generator employed at each vehicle wheel comprises a casing mounted on the brake backing plate and housing a rotatable inertial mass driven by the vehicle wheel in which electrical contacts are used to sense acceleration forces of the wheel. The antilocking brake systems within which devices of this type may be employed are disclosed in more detail in the latter of the above applications. Various pressure control means may be used, including inlet and outlet valves as in application Ser. 771,079 or so called pressure modulators as in the above patents. In general, the systems disclosed involve modification of the pressure applied by the master cylinder to the wheel cylinders so as to cause the rotational speed of the vehicle wheel to fluctuate about an ideal value during brake application. Various arrangements may be used, including those in which the wheel cylinder pressure is held constant for a predetermined time upon attainment of some predetermined value of wheel rotational deceleration and then permitted to decrease until some predetermined value of wheel rotational acceleration is sensed whereafter the cycle is repeated, or other specifically different cycles may be employed to yield discrete wheel cylinder pressure steps or fluctuations tending to cause the actual wheel rotational speed to fluctuate around some ideal value during brake application.

SUMMARY OF THE INVENTION

The present invention is directed to signal generators for systems such as are described generally above wherein the wheel-associated signal generator means is sensitive to rotational acceleration forces, positive or negative, which may be acting on the wheel. Of primary concern in connection with the present invention is the provision of a signal generator of this type in which a freely rotatable inertial mass, which is not provided with a spring restraint, is completely enclosed and housed within a casing and the entire mechanism directly attached to the vehicle wheel for rotation in consonance therewith. The device is provided with a mechanism to increase the damping effect on the inertial mass as a function of the relative rotational speed. The inertial mass carries circumferentially spaced elements cooperating with a fixed element or elements on the housing which, by inductive or capacitive coupling, detect relative motion of the inertial mass with respect to the housing under the influence of acceleration forces which may be acting on the wheel. The signal generator is, thus, self-contained and characterized by the absence of electrical contacts and therefore is relatively troublefree and is capable of operation for protracted periods of time without maintenance. Means are provided for determining the time interval between adjacent output pulses from the signal generator and for providing an output control signal to actuate the pressure control means of the break system when the interval between adjacent pulses is shorter than a predetermined minimum time.

DETAILED DESCRIPTION OF THE INVENTION

Figure 1:
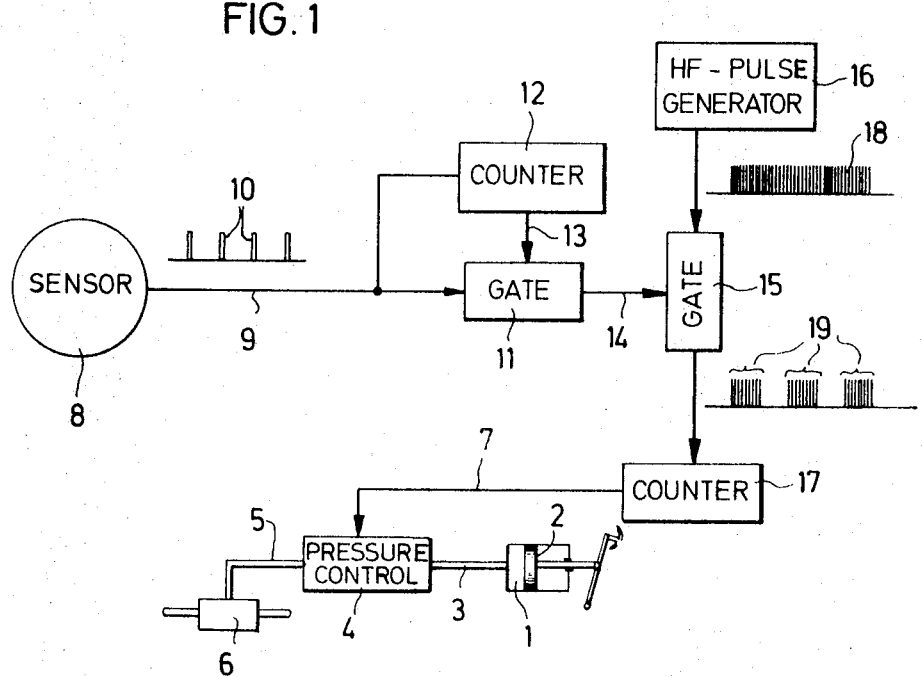
FIG. 1 is a diagrammatic view illustrating an antilocking brake system according to the invention.

With reference to FIG. 1 certain principles of an antilocking brake system are first generally shown. The reference character 1 indicates diagrammatically the master brake cylinder of an automotive type vehicle which, as is conventional, includes an operator-controlled pedal-operated piston 2 effective to establish pressure in the hydraulic line 3. As disclosed in the aforementioned patents and my prior applications, pressure control unit 4 is effective to control the application of the fluid pressure through the conduit 5 to the wheel brake cylinder indicated generally by the reference character 6. Normally, the pressure control means 4 allow the master cylinder pressure to be applied directly to the wheel cylinder 6. As soon as the rotational deceleration of the wheel exceeds a certain threshold, the signal generator according to this invention provides a control signal via output line 7, causing the pressure control unit to disconnect the master cylinder from the wheel brake cylinder and to relieve the brake pressure in the conduit 5. Normally, the pressure is then maintained at a constant level for some time, or, conforming to further signals, is more or less rapidly relieved. In any case, the pressure is rising again at the end of each control cycle by restoring the connection between master cylinder and wheel cylinder.

The effect of the system is to cause the wheel rotational speed to fluctuate about some ideal value which leads to efficient brake operation while obviating locking of the vehicle wheel.

Except for these general parts of an antilocking brake system FIG. 1 is confined to the representation of only those individual features of the signal generator which are indispensable for the generation of the first deceleration signal within one control cycle. Thus, provision is made, for instance, for a sensor indicated generally by the reference character 8 which provides at its output line 9 the pulses 10. These pulses are generated at intervals proportional to the relative rotational speed between the vehicle wheel and the inertial mass incorporated in the sensor. The pulses 10 are routed to gate 11, which is normally closed, and to a counter 12. The counter is so designed as to open gate 11 via line 13, as soon as it has received a predetermined number of pulses. The gate still remains open, permitting the pulses to control via line 14 a further gate 15, causing said gate to open at the arrival of one pulse and to close at the next. The gate 15 is arranged between a HF-pulse generator 16 and a special counter 17. The HF-pulse generator 16 is continuously issuing pulses 18 at a very high pulse frequency, of which pulse trains 19 are passed through gate 15 in the rhythm of the pulses 10 to the special counter 17. Both the length of the pulse trains 19 and the intervals between them correspond to the intervals of the pulses 10. The special counter 17 is so designed that, at the arrival of a new pulse train it provides a control signal on line 7 if the preceding pulse train has failed to reach a predetermined number of pulses. In the final effect, this leads to the generation of a control signal every time the interval between two pulses 10 is below a certain minimum time.

The function of counter 12 and gate 9 consists in the prevention of a control signal, if only short term decelerations of the vehicle wheel occur which are due to unevenness or bumps of the road surface. In this case, a few pulses 10 in short succession are likely to occur. However, as long as a certain predetermined number of pulses has not been reached, counter 12 will not open gate 11, causing gate 15 to remain permanently open or closed. Thus, either many are no high frequency pulses are routed to the special counter 17 which, as a result, will provide no control signal.

If, on the other hand, the marginal number of pulses, to which the counter 12 is set, is reached or exceeded, then gate 11 will open, while gate 15 will alternately close or open, so that the pulse trains 19 are fed into special counter 17. Now follows a monitoring sequence to control the number of pulses of the pulse trains 19, and, if necessary, a control signal is generated.

Figure 2:
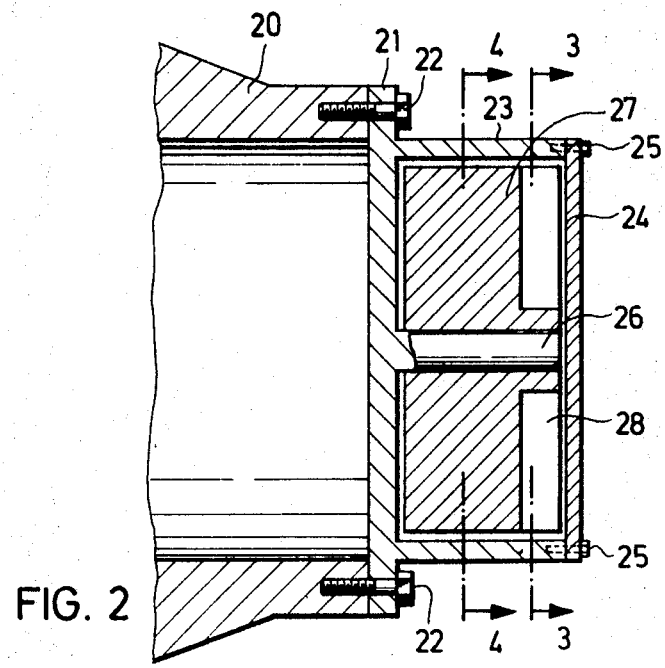
FIG. 2 is a longitudinal section taken through a portion of a wheel hub and a sensor constructed according to the present invention.

The signal generator mechanism for each wheel, according to the present invention, is shown in FIG. 2 and will be seen to include a housing 23 provided with a base flange 21 by means of which the housing may be secured directly to the outboard end of the brake drum hub 20 by suitable fasteners 22 as shown. Disposed within the housing and in alignment with the wheel rotational axis is a stub shaft 26 upon which is journaled the freely rotatable inertial mass 27, which is not restrained by springs or something alike. The housing 23 is provided with and end plate 24 secured as by suitable fasteners 25 which normally closes the housing cavity within which the inertial mass 27 is disposed. The mechanism shown in FIG. 2 and as described briefly above may be made of very small size and, for this reason, may be attached directly to the vehicle wheel in the fashion indicated.

Figure 3:
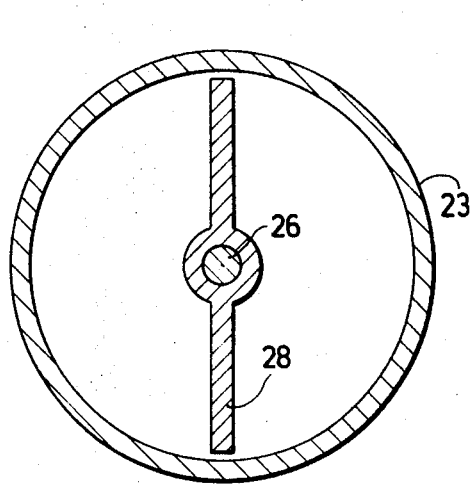
FIG. 3 is an enlarged transverse section taken substantially along the plain of section line 3-3 in FIG. 2 illustrating a damping arrangement.

The damping of the inertial mass 27 may be effected in the fashion indicated in the FIGS. 2 and 3 wherein it will be seen that the mass 27 is provided at its right end with a paddle 28. The housing 23 may be filled with a liquid to provide for at least nearly speed-proportional damping.

Figure 4:
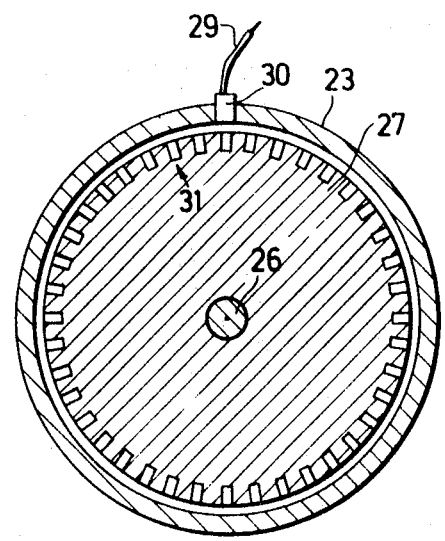
FIG. 4 is an enlarged transverse section taken substantially along the plain of section line 4-4 in FIG. 2 illustrating the inductive or capacitive pickup system.

As shown in FIG. 4, the main body portion of the inertial mass 27 is of cylindrical configuration and is provided on its periphery with circumferentially spaced elements 31. Correspondingly, the housing 23 is provided with a pickup element 30 which under acceleration and deceleration forces, which may be acting on the wheel, cooperates with the elements 31 to produce the pulses 10 at the conductors 29, which are identical with the output line 9 previously described. The elements 31 and the pickup 30 may be either of capacitive or inductive coupling type. It may be appreciated, that in any event acceleration as well as deceleration forces may be acting on the wheel. Both are effective to produce pulse trains.

Therefore an identifying network must be provided, which is not shown in FIG. 1, to distinguish the deceleration pulse trains from the acceleration pulse trains.

It will be understood that the above description of the present invention is susceptible to various modifications, changes and adaptations.

I claim:

1. In a pressure-actuated vehicle brake system of the type including an operator-controlled master cylinder, a vehicle wheel, a wheel cylinder connected to said master cylinder, and pressure control means interposed between said master cylinder and said wheel cylinder for controlling the braking pressure in said wheel cylinder to prevent locking of the associated vehicle wheel, signal generator means for sensing acceleration forces which may be acting upon said vehicle wheel, said signal generator means comprising in combination:

a. a housing connected to said vehicle wheel for rotation therewith;
   b. an inertial mass mounted within said housing for unrestricted rotation any spring restraint) in response to acceleration forces acting upon said vehicle wheel;
   c. damping means for damping said mass, the damping effect being a function of the relative rotational speed of said mass with respect to the rotational speed of said wheel;
   d. pickup means fixed to said housing and to said mass for producing a pulse output in response to said relative rotational speed;
   e. control output producing means, measuring the time intervals between the pulses of said pulse output and producing a control output for actuating said pressure control means, if at least one of said intervals is shorter than a certain minimum time.

2. The combination defined in claim 1 whereby said damping effect is substantively proportional to said relative rotational speed.

3. The combination defined in claim 1 and comprising means for impeding said actuating of said pressure control means until a certain number of pulses of said pulse output has appeared, this number calculating from anew after each actuation of said pressure control means.